United States Patent
Abe et al.

(10) Patent No.: US 10,282,825 B2
(45) Date of Patent: May 7, 2019

(54) IMAGE PROCESSING APPARATUS AND IMAGING APPARATUS

(71) Applicant: Panasonic Intellectual Property Management Co., Ltd., Osaka (JP)

(72) Inventors: Mitsuo Abe, Osaka (JP); Hirofumi Ishii, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 58 days.

(21) Appl. No.: 15/614,748

(22) Filed: Jun. 6, 2017

(65) Prior Publication Data

US 2018/0075617 A1    Mar. 15, 2018

(30) Foreign Application Priority Data

Sep. 13, 2016  (JP) ................. 2016-178999
Apr. 3, 2017   (JP) ................. 2017-073480

(51) Int. Cl.
    *G06T 5/50*    (2006.01)
    *G06T 5/00*    (2006.01)
    *H04N 5/232*   (2006.01)

(52) U.S. Cl.
CPC ............. *G06T 5/003* (2013.01); *G06T 5/50* (2013.01); *H04N 5/23212* (2013.01);
(Continued)

(58) Field of Classification Search
CPC .......... G06T 5/00; G06T 5/001; G06T 5/003; G06T 5/004; G06T 5/005; G06T 5/50; G06T 7/50; G06T 7/571; G06T 2207/10141; G06T 2207/10148; G06T 3/0068
(Continued)

(56) References Cited

U.S. PATENT DOCUMENTS

2007/0230938 A1  10/2007  Hatanaka
2009/0040364 A1*  2/2009  Rubner ............... G06T 3/4053
                                        348/362

(Continued)

FOREIGN PATENT DOCUMENTS

JP    2007-267184    10/2007
JP    2010-166519    7/2010
(Continued)

*Primary Examiner* — Dwayne D Bost
*Assistant Examiner* — Stephen M Brinich
(74) *Attorney, Agent, or Firm* — Renner Otto Boisselle & Sklar, LLP

(57) ABSTRACT

In the imaging apparatus, the image processor combines the data of the plurality of the images so as to generate data of a still image deeper in depth of field. The image processor performs alignment of two images to be combined. In a case where the alignment achieves success, the image processor combines the data of the two images. In a case where the alignment ends in failure and yet where a difference between focus positions of the two images is smaller than a predetermined value, the image processor does not combine the data of the two images. In a case where the alignment ends in failure and yet where the difference between the focus positions of the two images is not smaller than the predetermined value, the image processor combines the data of the two images.

10 Claims, 17 Drawing Sheets

(52) U.S. Cl.
CPC ............... *G06T 2207/10016* (2013.01); *G06T 2207/10024* (2013.01); *G06T 2207/10148* (2013.01)

(58) Field of Classification Search
USPC ..................... 382/254–255, 293–297, 151; 348/262–263, 744–745
See application file for complete search history.

(56) References Cited

U.S. PATENT DOCUMENTS

| | | | |
|---|---|---|---|
| 2010/0157079 A1* | 6/2010 | Atanassov | G06T 5/50 348/222.1 |
| 2010/0271498 A1* | 10/2010 | Hwang | G06T 5/50 348/222.1 |
| 2011/0273471 A1 | 11/2011 | Nagasaka et al. | |
| 2014/0267833 A1* | 9/2014 | Chen | G06T 5/003 348/239 |
| 2015/0326798 A1* | 11/2015 | Muto | H04N 5/23229 348/239 |
| 2015/0358546 A1 | 12/2015 | Higashiyama | |
| 2016/0028948 A1 | 1/2016 | Omori et al. | |
| 2016/0191784 A1 | 6/2016 | Murayama et al. | |

FOREIGN PATENT DOCUMENTS

| | | |
|---|---|---|
| JP | 2014-207502 | 10/2014 |
| JP | 2015-233250 | 12/2015 |
| WO | 2015/020038 | 2/2015 |

\* cited by examiner

FIG. 7

Focus information table 60

(A)

| | Focus lens position (Pnear) closest to the nearest end | Focus lens position (Pfar) closest to the infinity end |
|---|---|---|
| a | 10 | 200 |

(B)

| | | | | | | | | |
|---|---|---|---|---|---|---|---|---|
| Number of AF area | 1 | 2 | 3 | ... | 19 | ... | 49 | |
| b | Frame number | 5 | 43 | 36 | ... | 50 | ... | 100 |
| c | Focus lens position (In focus position) | 10 | 100 | 75 | ... | P | ... | 200 |

IMAGE PROCESSING APPARATUS AND IMAGING APPARATUS

BACKGROUND

1. Technical Field

The present disclosure relates to image processing apparatuses and imaging apparatuses, with each of the apparatuses having a function of combining a plurality of images to produce an image with a deep depth of field.

2. Description of the Related Art

Patent Literature 1 discloses an imaging apparatus for capturing a plurality of images with different focuses, and for producing an image with a deep depth of field by using the plurality of the captured images, with the thus-produced image is deeper in depth of field than the captured images. With the imaging apparatus disclosed in Patent Literature 1, an operator selects a plurality of objects on which the operator wants to focus. Then, the objects' images are captured on the basis of positions of focus of the subjects having been selected by the operator. With this configuration, a combined image can be obtained which is focused at the focus positions as intended by the operator.

CITATION LIST

Patent Literature

PTL 1: Japanese Patent Unexamined Publication No. 2014-207502

SUMMARY

The present disclosure provides an image processing apparatus and an imaging apparatus, each of which combines a plurality of images to generate an image which has a deeper depth of field.

In accordance with one aspect of the present disclosure, the imaging apparatus is provided. The imaging apparatus includes an imaging unit, an image processor, and a controller. The imaging unit captures an object image, while changing a focus position, to generate data of a plurality of images, each of the plurality of the images having a corresponding one of different focus positions. The image processor combines the data, generated by the imaging unit, of the plurality of the images so as to generate data of a still image deeper in depth of field. The controller controls the image processor, in generating the data of the still image by combining data of two images included in the plurality of the images, such that the image processor performs alignment of images expressed by data of the two images to be combined and then combines the data of the two images. In a case where the alignment achieves success, the controller controls the image processor such that the image processor combines the data of the two images. In a case where the alignment ends in failure and yet where a difference between focus positions of the two images is smaller than a predetermined value, the focus positions of the two images being obtained when the data of the two images are generated, the controller controls the image processor such that the image processor does not combine the data of the two images. In a case where the alignment ends in failure and yet where the difference between the focus positions of the two images is not smaller than the predetermined value, the controller controls the image processor such that the image processor combines the data of the two images.

In accordance with another aspect of the present disclosure, an image processing apparatus is provided. The image processing apparatus includes an image processor and a controller. The image processor combines data, generated by an imaging apparatus, of a plurality of images so as to generate data of a still image deeper in depth of field, each of the plurality of the images having a corresponding one of different focus positions. The controller controls the image processor, in generating the data of the still image by using data of two images included in the plurality of the images, such that the image processor performs alignment of images expressed by data of the two images to be combined and then combines the data of the two images. In a case where the alignment achieves success, the controller controls the image processor such that the image processor combines the data of the two images. In a case where the alignment ends in failure and yet where a difference between focus positions of the two images is smaller than a predetermined value, the focus positions of the two images being obtained when data of the two images are generated, the controller controls the image processor such that the image processor does not combine the data of the two images. In a case where the alignment ends in failure and yet where the difference between the focus positions of the two images is not smaller than the predetermined value, the controller controls the image processor such that the image processor combines the data of the two images.

In accordance with the image processing apparatus and the imaging apparatus according to the present disclosure, even in cases where alignment of two images ends in failure, the images are combined if a difference between focus lens positions of the two images is not smaller than a threshold value. With this configuration, an image with a deeper depth of field can be obtained even in cases where the alignment of the images cannot be achieved.

BRIEF DESCRIPTION OF THE DRAWINGS

FIG. 7 is a view illustrating an example of a focus information table;

DETAILED DESCRIPTION OF THE PREFERRED EMBODIMENT

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art. Note that the accompanying drawings and the following descriptions are presented to facilitate fully understanding of the present disclosure by those skilled in the art and, therefore, are not intended to impose any limitations on the subject matter described in the appended claims.

Now, exemplary embodiments of an imaging apparatus according to the present disclosure are described with reference to the drawings.

First Exemplary Embodiment

1. Configuration

Figure 1:
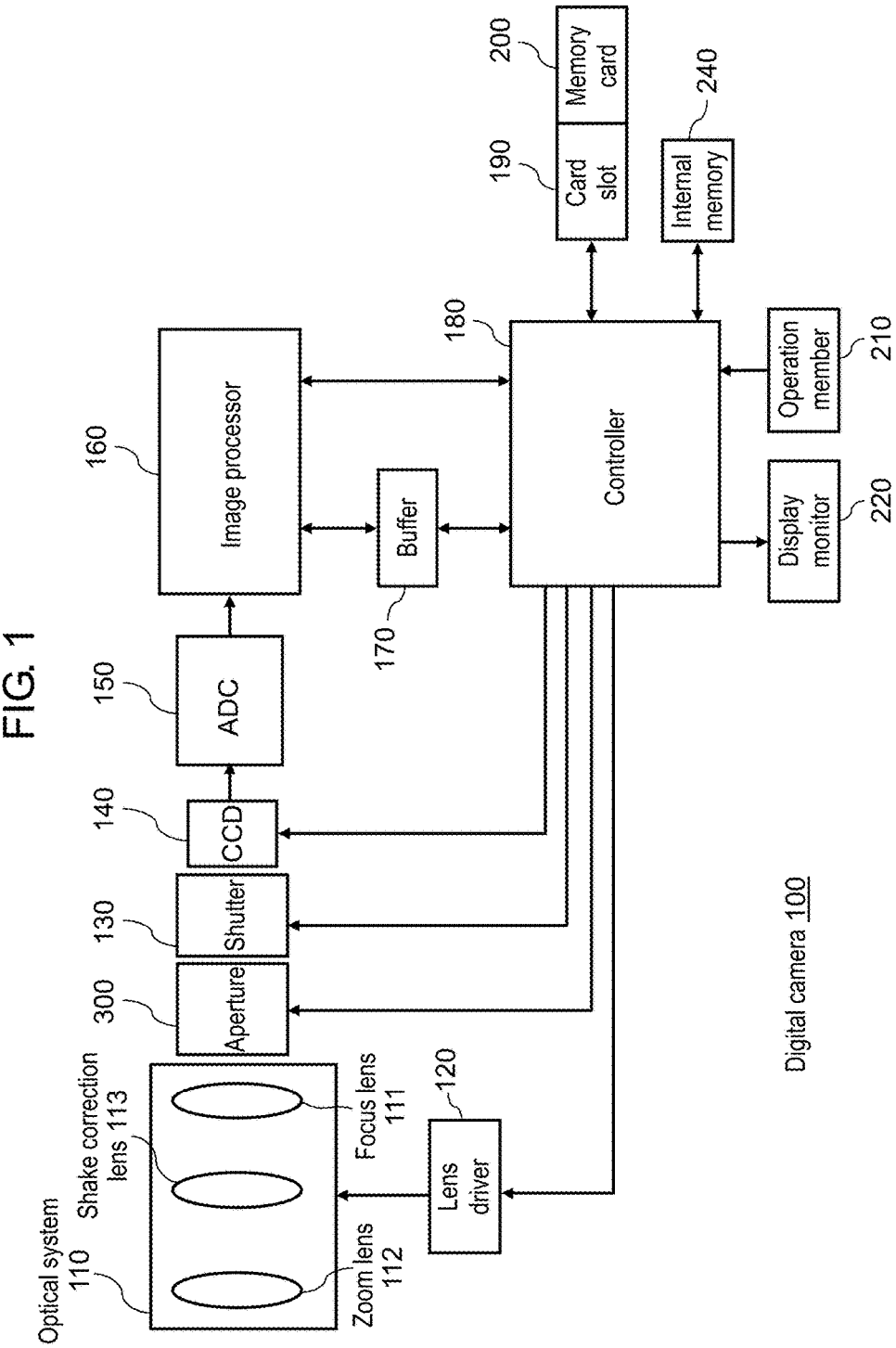
FIG. 1 is a view illustrating a configuration of a digital camera according to an embodiment.

An electrical configuration of a digital camera (an example of the imaging apparatus) according to a first embodiment will be described with reference to FIG. 1. FIG. 1 is a block diagram illustrating a configuration of digital camera 100. Digital camera 100 is an imaging apparatus that produces an object image with optical system 110 configured with one or more lenses, and that captures the object image with charge-coupled device (CCD) 140. Image data produced by CCD 140 are subjected to various kinds of processing by image processor 160 and then stored in memory card 200. Hereinafter, the configuration of digital camera 100 will be described in detail.

Optical system 110 includes focus lens 111 and zoom lens 112. The object image can be enlarged or reduced by moving zoom lens 112 along the optical axis. Moreover, a focus (focus state) of the object image can be adjusted by moving focus lens 111 along the optical axis. In addition, optical system 110 includes shake correction lens 113 for correcting an image blur which is caused by a shake of digital camera 100.

Lens driver 120 drives various kinds of lenses included in optical system 110. Lens driver 120 includes a zoom motor for driving zoom lens 112 and a focus motor for driving focus lens 111, for example.

Aperture 300 adjusts the degree of opening of its opening so as to adjust an amount of light passing through it, either automatically or in accordance with user's determination.

Shutter 130 is a means to obstruct light from passing through to reach CCD 140. Shutter 130, together with optical system 110 and aperture 300, controls optical information that represents the object image. Moreover, optical system 110 and aperture 300 are accommodated in the inside of a lens barrel (not shown).

CCD 140 captures an object image produced by optical system 110 to produce image data. CCD 140 includes a color filter, a light-receiving element, and an auto gain controller (AGC). The light-receiving element converts an optical signal, which is condensed by optical system 110, into an electrical signal, thereby producing image information. The AGC amplifies the electrical signal that has been output from the light-receiving element. CCD 140 is an example of an imaging unit.

An analog-digital converter (ADC: A/D converter) 150 converts the analog image data produced by CCD 140 into digital image data.

Image processor 160, being controlled by controller 180, subjects the digital image data to various kinds of processing, with the data having been produced by CCD 140 and then converted. Image processor 160 produces image data which include: data for displaying images on display monitor 220, and image data for storing images in memory card 200. For example, image processor 160 subjects the image data produced by CCD 140 to the various kinds of processing, such as, a gamma correction, white balance correction, and flaw correction. Moreover, image processor 160 compresses the image data produced by CCD 140 in a compression format or the like in conformity with the H.264 standard or the MPEG2 standard. Furthermore, image processor 160 can produce moving-image data (4 k-resolution moving-image data) with the number of pixels of 4000×2000 or so, for example, in accordance with image data produced by CCD 140. Image processor 160 is capable of subjecting the thus-produced 4 k-resolution moving-image data to various kinds of processing that are to be described later. For example, image processor 160 performs focus stacking (focus synthesizing) processing by using frame images that configure the thus-produced 4 k-resolution moving-image data; its detailed description will be made later.

Controller 180 is a means to control the whole of digital camera 100. Controller 180 can be implemented by using semiconductor elements and the like. Controller 180 is an example of a controller.

Each of image processor 160 and controller 180 may be configured only with hardware or, alternatively, configured with a combination of hardware and software. Controller 180 can be implemented by using, such as, a microcomputer, central processing unit (CPU), micro-processing unit (MPU), digital signal processor (DSP), application-specific integrated circuit (ASIC), or field-programmable gate array (FPGA).

Buffer 170 functions as a work memory for image processor 160 and controller 180. Buffer 170 can be implemented by using, for example, a dynamic random access memory (DRAM), a ferroelectric memory, or the like.

Card slot 190 is a means to mount memory card 200 in digital camera 100. Card slot 190 is capable of coupling memory card 200 to digital camera 100, mechanically and electrically.

Memory card 200 includes a flash memory, a ferroelectric memory, or the like in the inside of the card, and is capable of storing data, such as, image files produced by image processor 160.

Internal memory 240 is configured with an internal memory, a ferroelectric memory, or the like. Internal memory 240 stores data, control programs to control the whole of digital camera 100, and the like.

Operation member 210 is a generic term that refers to user interfaces which receive user's operations. Operation member 210 includes: a button, lever, dial, touch panel, and switch; they receive operations by a user. Moreover, operation member 210 includes a focus ring which is disposed at the outer periphery of the lens barrel. The focus ring is a member that is rotationally operated by the user to move focus lens 111.

Display monitor 220 is capable of displaying images including: an image (through image) expressed by the image data produced by CCD 140, and an image expressed by image data that are read from memory card 200. In addition, display monitor 220 is capable of displaying various menu screens which are used to perform various settings of digital camera 100. Display monitor 220 is configured with, such as, a liquid crystal display device or an organic electroluminescent (EL) display device. Display monitor 220 is an example of a display unit.

Gyro sensor 250 is a sensor to detect camera shakes (motion) of digital camera 100. In accordance with an output signal from gyro sensor 250, there are performed a camera-shake correction operation, rest determination, and the like.

Figure 2:
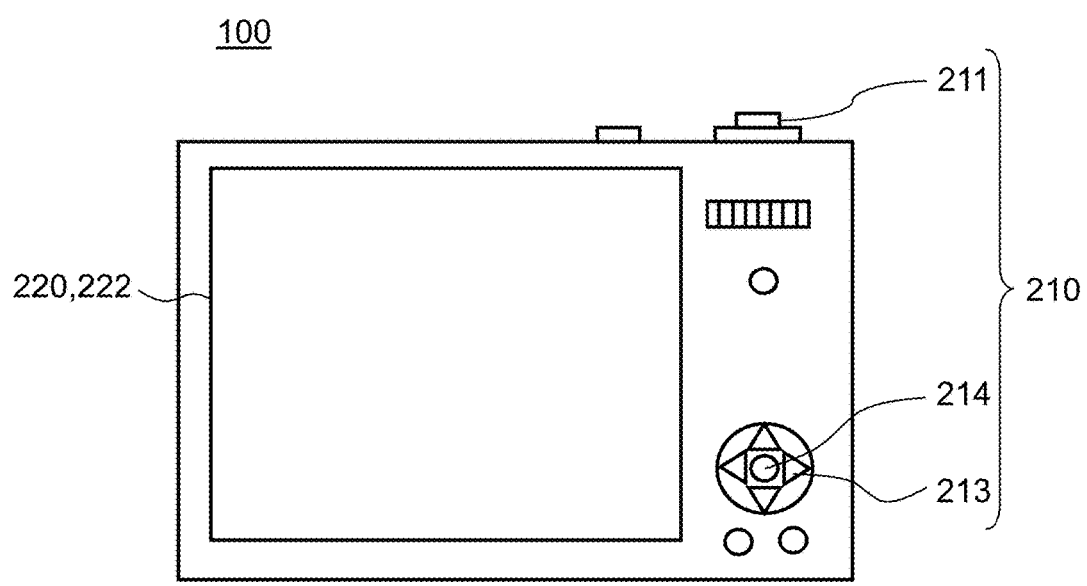
FIG. 2 is a rear-elevation view of the digital camera.

FIG. 2 is a rear-elevation view of digital camera 100. In FIG. 2, there are shown release button 211, selection buttons 213, decision button 214, and touch panel 222, which are examples of operation members 210. Upon receiving a user's operation, a corresponding one of operation members 210 transmits various instruction signals to controller 180.

Release button 211 is a two-step pushbutton. When release button 211 is subjected to half-depressing operation by the user, controller 180 performs auto focus control (AF control), auto exposure control (AE control), and the like. Then, when release button 211 is subjected to full-depressing operation by the user, controller 180 stores image data that are captured at the timing of the depressing operation, as a recorded image, into memory card 200 or the like.

Selection buttons 213 are up/down/left/right pushbuttons. By depressing any of up/down/left/right selection buttons 213, the user can perform a corresponding one of operations including: moving a cursor, a frame to be described later, and the like; and selecting various items of conditions that are currently being displayed on display monitor 220.

Decision button 214 is a pushbutton. In cases where digital camera 100 is in a shooting or playback mode, when decision button 214 is depressed by the user, controller 180 displays a menu screen on display monitor 220. The thus-displayed menu screen is a screen image that is used to set various conditions for shooting and playing back. When decision button 214 is depressed, in a state where a setting item has been selected from the setting items for various conditions, controller 180 decides to set the selected setting item.

Touch panel 222 is disposed to be superposed on the display screen of display monitor 220. The touch panel detects touch operations which are performed on the display screen by a user's finger. With this configuration, the user can perform operations, such as, designation of a display area of an image which is currently being displayed on display monitor 220. Touch panel 222 is an example of an operation unit.

2. Operation

Descriptions will be made regarding operations of digital camera 100 configured as described above. Digital camera 100 has a function of focus stacking (focus synthesizing), which is as follows: The camera combines a plurality of different images which have been shot with different focus positions (focus lens positions), thereby generating a still image with a pseudo-deep depth of field. Digital camera 100 is an example of an image processing apparatus in that it has the function of focus stacking. Hereinafter, operations of digital camera 100 will be described concerning to the function of focus stacking.

2-1. Focus Stacking

Figure 3:
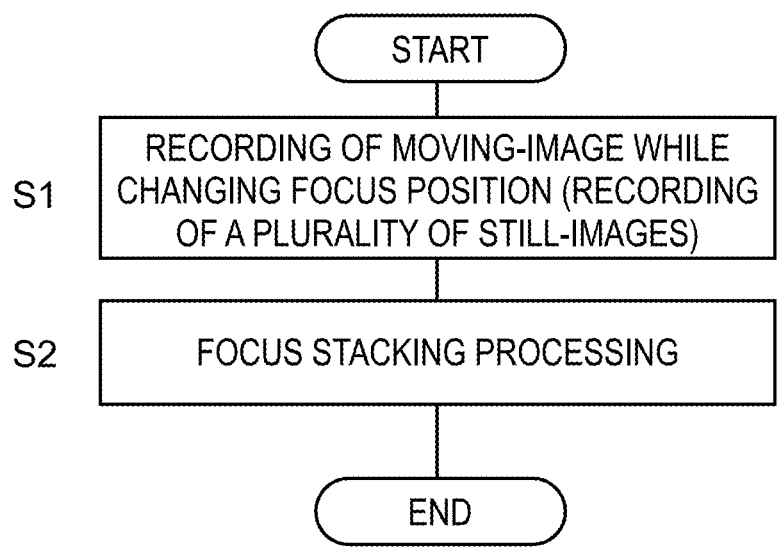
FIG. 3 is a flowchart illustrating a flow of focus stacking processing.

FIG. 3 is a flowchart illustrating a process in which digital camera 100 performs the function of focus stacking. To obtain a plurality of still images to be used for the focus stacking, digital camera 100 performs processing of recording a moving image while changing its focus position (position of focus) (S1). After that, digital camera 100 performs focus stacking processing (S2) by using frame images (still images) that are contained in the thus-recorded moving image, thereby generating a still image with a deep depth of field. Note that the focus stacking processing (S2) may be performed continuously after the moving-image recording processing (S1) or, alternatively, may be performed at any timing after the moving-image recording processing (S1) has been completed.

2-1-1. Recording of Moving Image for Use in Focus Stacking

Descriptions will be made regarding the processing (S1) of recording a moving image to be used for focus stacking, with reference to FIGS. 4 to 7. In the processing, to obtain a plurality of different still images (frame images) with different focus positions, the moving image is recorded while its focus position is being changed continuously. Hereinafter, the moving image recorded in this way is referred to as the "multi-focus moving image." Digital camera 100 is provided with a specific shooting mode in which such a multi-focus moving image is recorded. The user can place digital camera 100 into the specific shooting mode, by operating a menu or an operation dial, for example.

The multi-focus moving image is a moving image which is recorded while its focus position is being changed continuously. As a multi-focus moving image, for example, a high-definition 4 k-resolution moving image with the number of pixels of 4000×2000 or so is recorded. The focus stacking processing is performed using a plurality of frame images which are selected, on the basis of user's designation, from among the frame images that configure the 4 k-resolution moving image. The image generated in this way has high image quality because it is produced via the focus stacking on the basis of the 4 k-resolution moving image.

Figure 4:
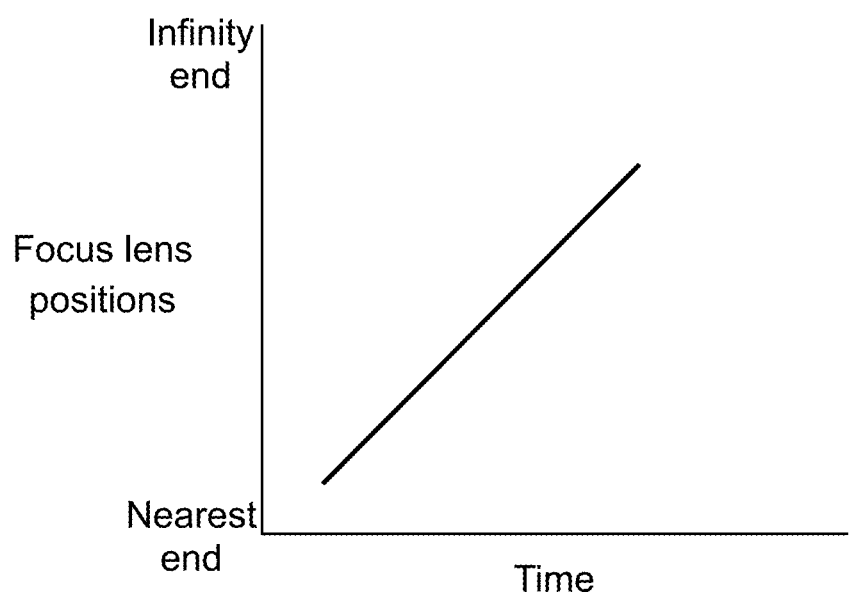
FIG. 4 is a graph illustrating a travel of a focus lens when a multi-focus moving image is recorded.

In recoding a multi-focus moving image, the moving image is shot while its focus position is being changed, that is, focus lens 111 is travelling from a nearest end side toward an infinity end side (or vice versa), as shown in FIG. 4. The multi-focus moving image, which is recorded in this way, contains a plurality of different frame images Pn that are recorded at different focus positions. In the focus stacking processing, an image is generated by combining frame images (images indicated by hatching in FIG. 5) which are selected from among the plurality of the different frame images Pn that have been shot in this way. The thus-selected frame images correspond to an object's range that is designated by the user. Details of this will be described later.

Figure 6:
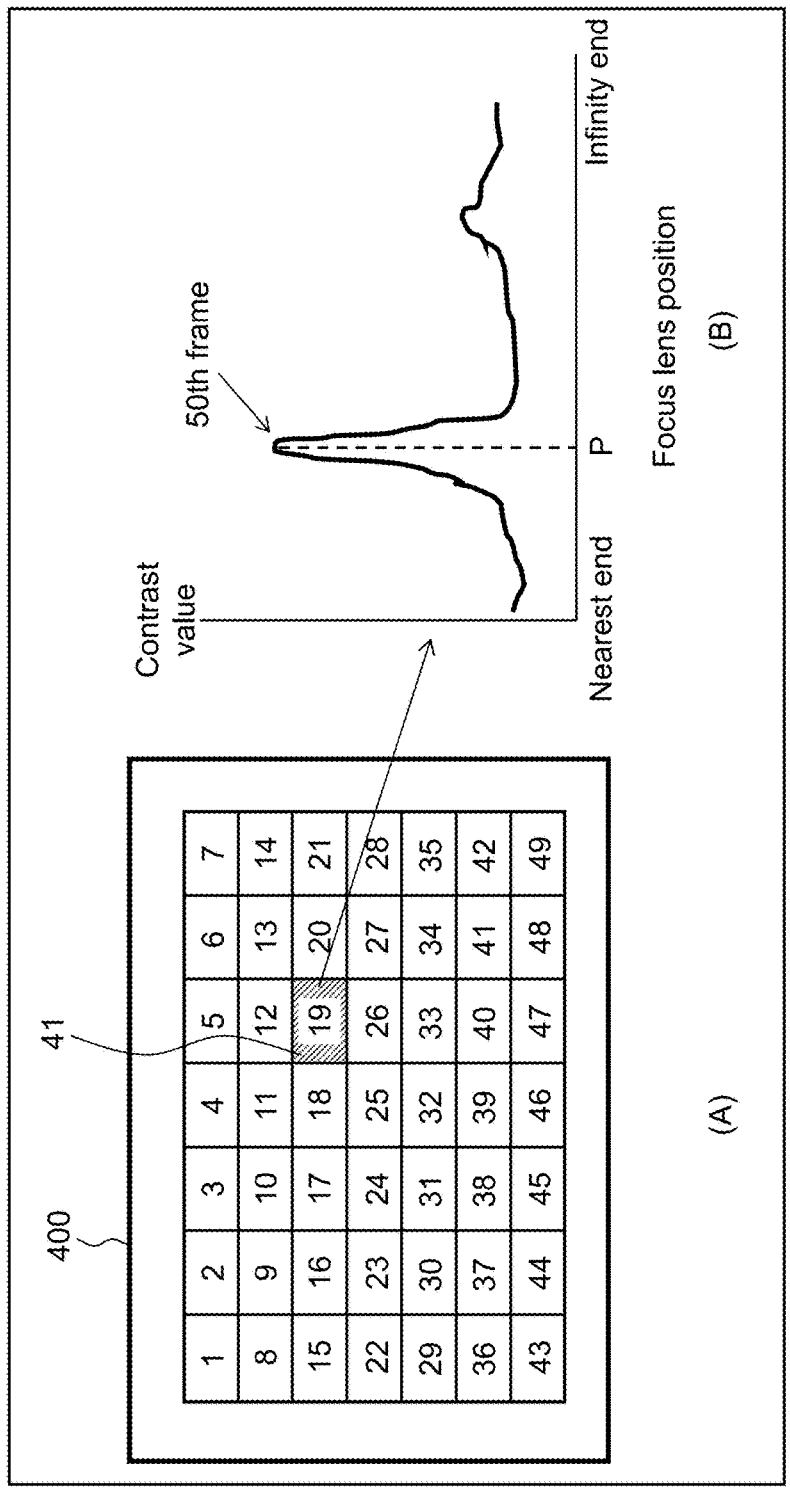
FIG. 6 is a view (A) illustrating a plurality of auto focus (AF) areas which is set in an image area and a graph (B) illustrating variations in contrast value in an AF area, with the variations accompanying the travel of the focus lens.

In the auto focus operation of digital camera 100 according to the embodiment, a plurality of auto focus (AF) areas is set in image area 400, as shown in (A) of FIG. 6. In the embodiment, 49 AF areas (7 rows by 7 columns) are set. For every AF area, a frame in which an object in the AF area is in focus is determined (the frame is referred to as the "in-focus frame," hereinafter). Information on the thus-determined in-focus frame is recorded in a focus information table. Before digital camera 100 records (shoots) a multi-focus moving image, the camera performs a focus searching operation to search every AF area to find the in-focus frame of the area, thereby producing the focus information table.

FIG. 7 is a view illustrating a data structure of the focus information table. As shown in (A) of FIG. 7, focus information table 60 includes information that indicates a driving range of focus lens 111; the driving range is a range of lens' travel during the focus searching operation and the moving-image recording operation. Specifically, focus information table 60 stores the following information, as the information indicating the driving range of focus lens 111. Such information includes: information (the nearest focus-lens position) that indicates the focus lens position (Pnear) closest to the nearest end, and information (the farthest focus-lens position) that indicates the focus lens position (Pfar) farthest from the nearest end toward the infinity end. Moreover, as shown in (B) of FIG. 7, focus information table 60 manages every AF area, with the focus lens position for the AF area (the position of focus lens 111 that brings the AF area into focus: focus position) being associated with the frame number of the in-focus frame of the AF area.

For example, a contrast value is determined for every AF area while focus lens 111 is travelling. At that time, regarding 19th AF area 41 shown in (A) of FIG. 6, when a peak in contrast is detected at focus lens position "P," as shown in (B) of FIG. 6, it is recognized that the frame shot at focus lens position "P" (i.e. the 50th frame in this case) is the in-focus frame associated with 19th AF area 41. Then, in focus information table 60, there are recorded both numeral "50" as the frame number of the in-focus frame and symbol "P" as the position of focus lens 111, both in a one-to-one association with the 19th AF area. Focus information table 60 is stored in a header part of moving image data obtained by shooting a moving image, for example.

Figure 8:
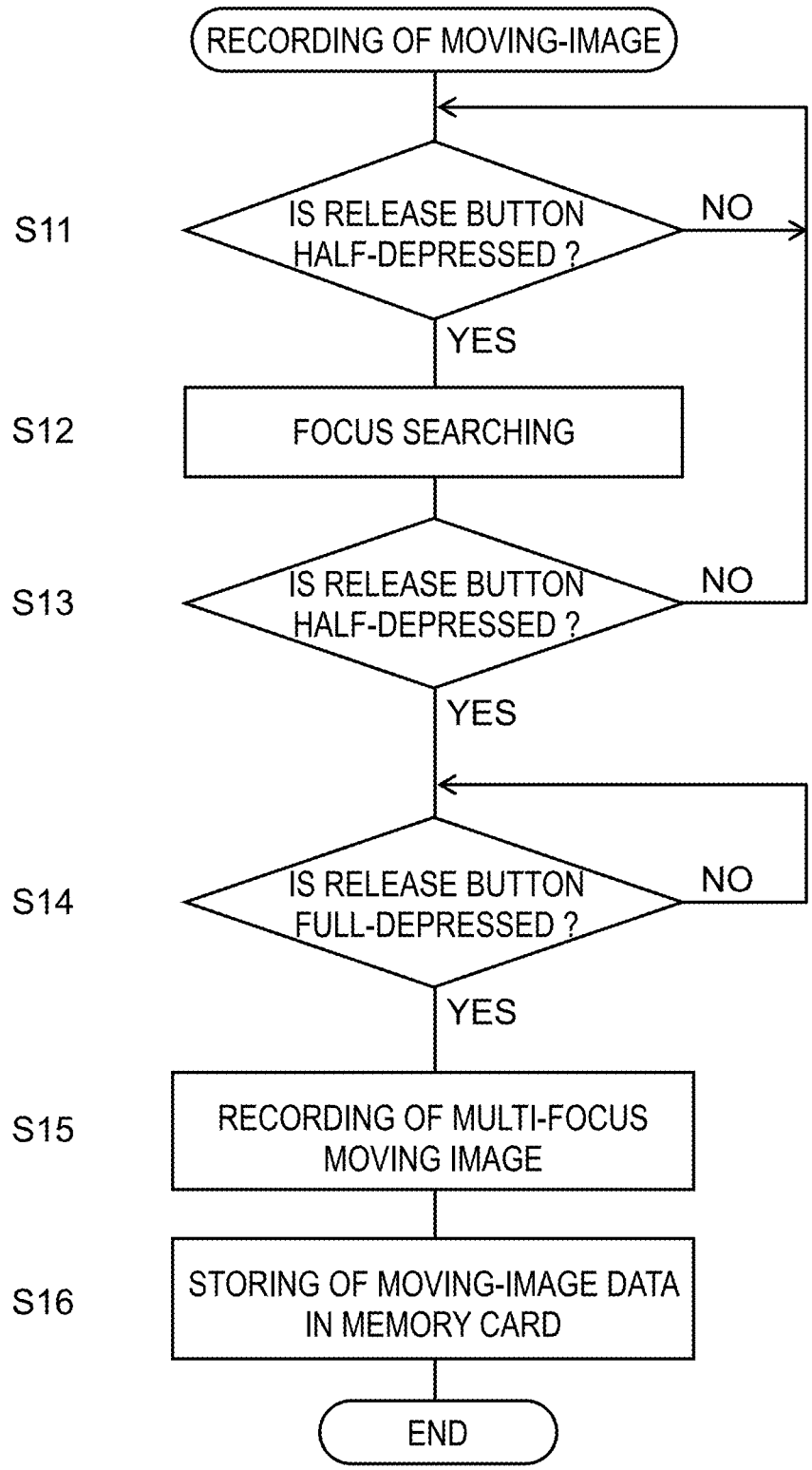
FIG. 8 is a flowchart illustrating recording processing of a focus-selecting moving image.

Detailed descriptions will be made regarding the processing (S1) of recording a moving image for use in the focus stacking, with reference to a flowchart shown in FIG. 8.

In digital camera 100, let us consider a state in which the camera has been placed in the specific shooting mode for recording a multi-focus moving image, and yet in which a desired angle of view has been set by operating zoom lens 112 and the like. Upon half-depressing of release button 211 by a user (YES, in S11), controller 180 performs a focus searching operation to detect a focus position of an image for every AF area, with the focus position being used in producing focus information table 60 (S12).

In the focus searching, controller 180 detects the contrast for every AF area while causing focus lens 111 to be travelling from the nearest end to the infinity end (or vice versa), see FIG. 6.

Then, controller 180 produces focus information table 60 on the basis of the thus-detected contrast values. Specifically, controller 180 determines the position of focus lens 111, for every AF area, at which the image shows the maximum contrast value among a plurality of the images while focus lens 111 is travelling from the nearest end to the infinity end, see (B) of FIG. 6. Then, the controller records the thus-determined position of focus lens 111 in focus information table 60, see row "c" shown in (B) of FIG. 7. In cases where, in an AF area, the contrast values of all the images are lower than a predetermined threshold value, it is determined that the AF area has no obvious focus position. Then, a predetermined value, which is intended to indicate an unknown focus position, is recorded in focus information table 60.

Moreover, after all the AF areas have been searched, controller 180 further records the following information in focus information table 60, see row "a" shown in (A) of FIG. 7. The recorded information includes: the nearest focus position (Pnear) closest to the nearest end, and the farthest focus position (Pfar) closest to the infinity end, with both the positions being chosen from among the focus positions that are determined while focus lens 111 is travelling from the nearest end to the infinity end. This completes the focus searching operation. Note that, at this point of operation, information on the frame numbers, to be shown in row "b" in (B) of FIG. 7, has yet to be contained in focus information table 60.

Returning to FIG. 8, the process continues as follows: After the focus searching has been completed, controller 180 determines whether or not release button 211 still remains in the half-depressed state made by the user (S13).

After the focus searching has been completed, when it is determined that release button 211 is no longer in the half-depressed state made by the user (NO in S13), controller 180 returns the process to Step S11. With this operation, it becomes possible for the user to redo the focus searching.

When it is determined that release button 211 still remains in the half-depressed state made by the user even after the focus searching has been completed (YES in S13), then controller 180 determines whether or not release button 211 is full-depressed by the user (S14).

After that, when release button 211 is full-depressed by the user (YES in S14), an image shooting operation for recording a multi-focus moving image is started (S15).

Figure 9:
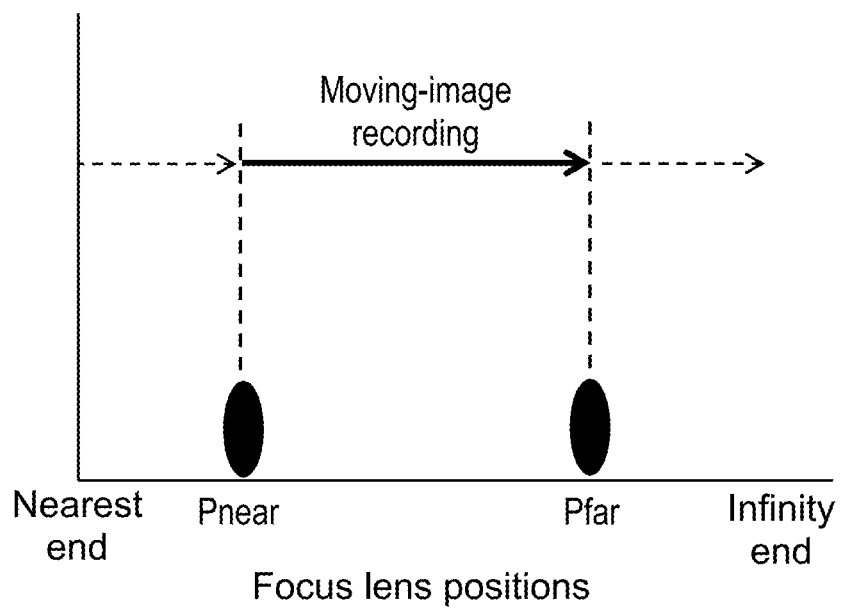
FIG. 9 is a view illustrating a travel range of the focus lens when the multi-focus moving image is recorded.

That is, controller 180 causes focus lens 111 to return to the nearest focus-lens position (Pnear), and then records a moving image (multi-focus moving image) while the focus lens is travelling to the farthest focus-lens position (Pfar), as shown in FIG. 9 (S15). The travel range of focus lens 111 when the moving image is recorded is restricted within such a range (from Pnear to Pfar), thereby preventing the recording of the moving-image in a range in which focus cannot be obtained. This can shorten the time required for recording the moving image. Note that the moving image is recorded in a predetermined format for moving image data. For example, the moving image is recorded in conformity with the MP4 standard (H.264/MPEG-4 AVC standard). While recording the moving image, display monitor 220 may display an icon, a message, or the like, for example, which indicates that the apparatus is currently recording the moving image.

Moreover, while recording the moving image, controller 180 associates the current position of focus lens 111 with the frame number of the corresponding frame among the frames that configure the moving image being currently recorded. With this operation, in focus information table 60, each of the AF areas is associated with the corresponding frame number, see row "b" shown in (B) of FIG. 7.

While recording the moving image, display monitor 220 displays the image being currently recorded. In addition, the display of an in-focus area in the image may be highlighted, thereby allowing the user to recognize the in-focus area. Displaying such a highlighted area makes it possible for the user to easily grasp the area being in focus in the image.

Returning to FIG. 8, the process continues as follows: When the moving-image recording is completed (S15), the moving image data are recorded in memory card 200, with the moving image data containing focus information table 60 that is stored in a header part of the data (S16). This operation completes the recording process (S1 shown in FIG. 3) of the moving-image (multi-focus moving image).

After the moving-image recording process (S1) has been completed, focus stacking processing (S2) is performed, in accordance with instructions by the user.

2-1-2. Focus Stacking Processing

Figure 10:
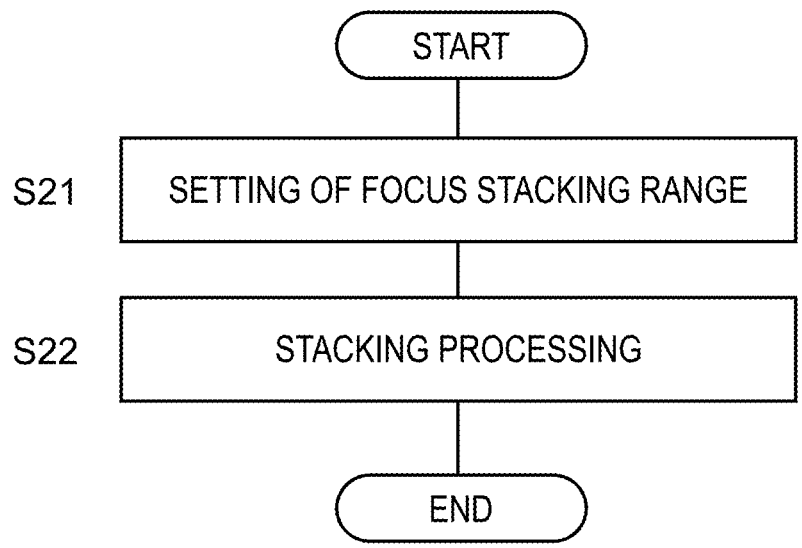
FIG. 10 is a flowchart illustrating the focus stacking processing.

Hereinafter, focus stacking processing (S2) will be described. FIG. 10 is a flowchart illustrating the focus stacking processing. In the focus stacking processing, controller 180 starts by setting a focus stacking range in accordance with the instructions by the user (S21), and then performs the stacking processing on the basis of the thus-set range (S22). Hereinafter, each of the processes (S21 and S22) will be described.

2-1-2-1. Setting of Focus Stacking Range

First, a user's operation for designating a focus stacking range is described.

Figure 11A:
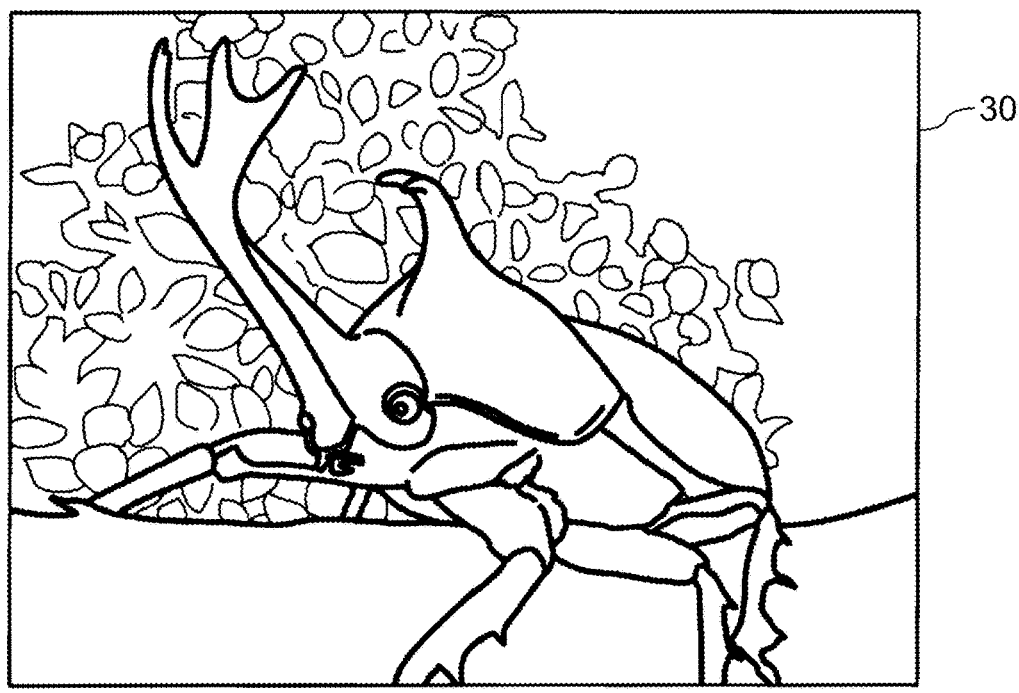
FIG. 11A is a view illustrating an example of a preview image.
Figure 11B:
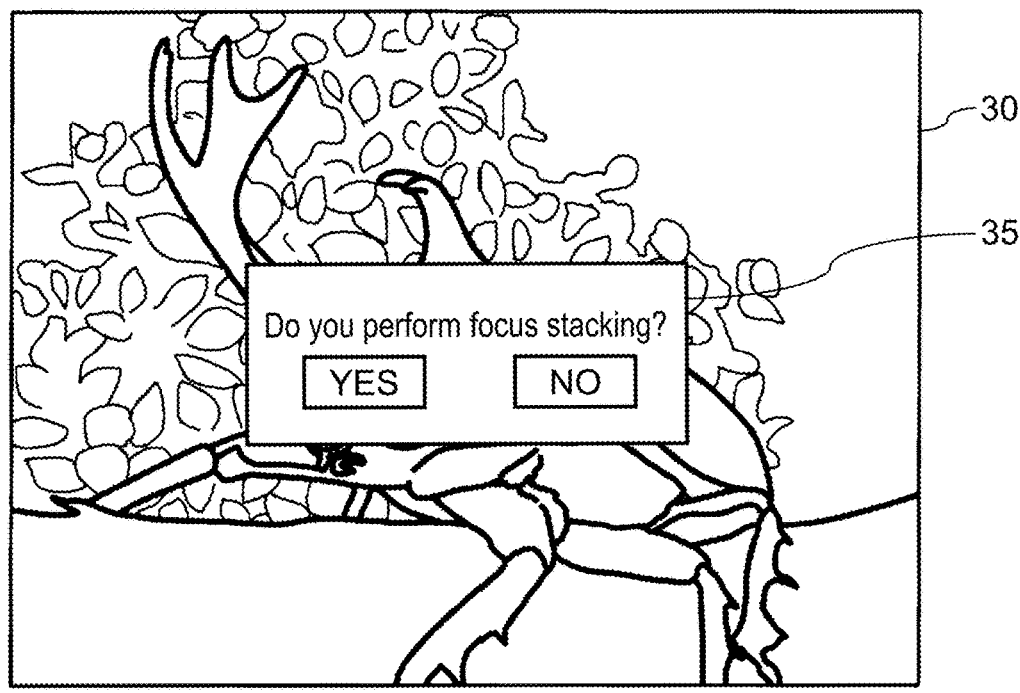
FIG. 11B is a view illustrating an example of a screen for asking a user about whether to perform focus stacking.

Immediately after the multi-focus moving image has been recorded, preview image 30 (still image) for checking to see the recorded image is displayed on display monitor 220, as shown in FIG. 11A. Preview image 30 is an image among a plurality of the frame images that configure the recorded multi-focus moving image. In a state of preview image 30 being displayed, when the user performs a predetermined operation (e.g. a touching operation onto a touch panel, a pressing operation on a designated button, etc.), dialog box 35 appears on preview image 30, as shown in FIG. 11B, for asking the user about whether to perform focus stacking. Note that, in cases where a playback screen is displayed for selecting and playing back an image from among the recorded images, dialog box 35 may also be displayed on the screen when the user performs a predetermined operation while a still image (one frame image) is being displayed which typically represents the multi-focus moving image.

When "YES" is chosen in dialog box 35, controller 180 causes display monitor 220 to display a range designation screen which is to be used for the user to designate an area (region) of an object that the user wants to bring into focus.

Figure 11C:
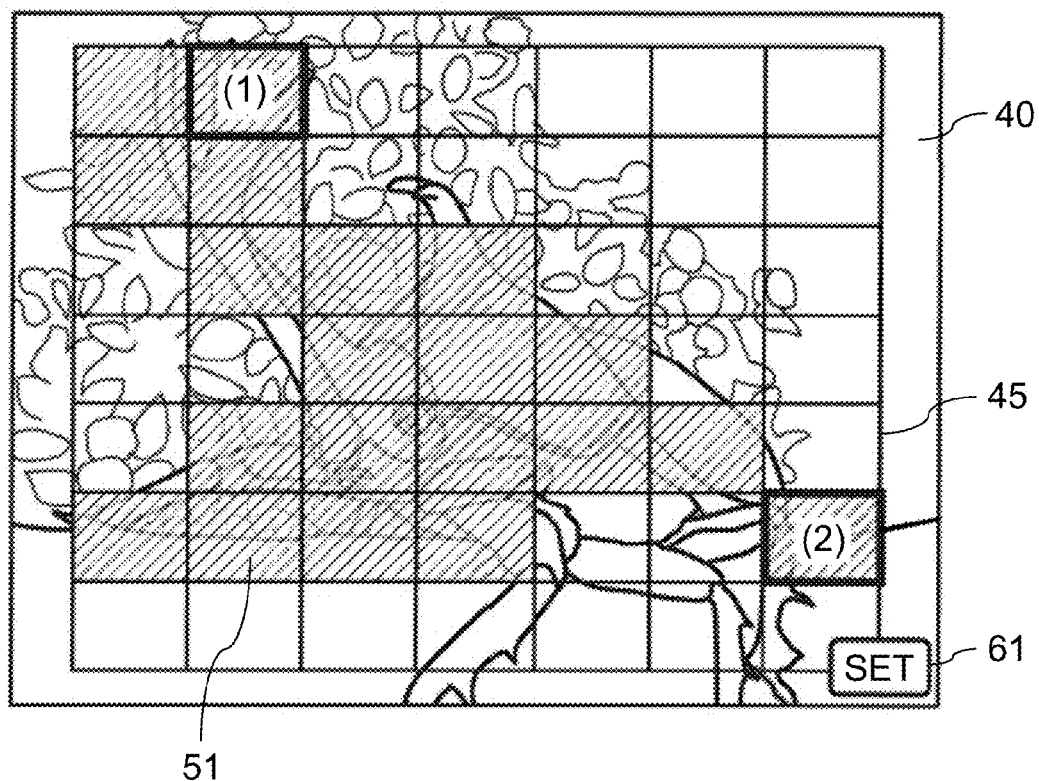
FIG. 11C is a view illustrating an example of display of a range designation screen to be used for designating a focus stacking range.

FIG. 11C is a view illustrating an example of range designation screen 40. In range designation screen 40, there are displayed images including: preview image 30, i.e. one (an image of the object) of the frame images that configure the multi-focus moving image; and area frame 45 that indicates a plurality of image areas (referred to only as "areas," hereinafter), with the area frame being superimposed on the preview image. Area frame 45 defines 49 areas (7 rows by 7 columns). Each of the areas indicated by area frame 45 is associated with the corresponding one of the AF areas shown in (A) of FIG. 6. The user can designate a range (a focus stacking range, in other words), which the user wants to bring into focus, of the object. This designation is made by designating two areas (i.e. a starting and an end point of the stacking range) by touching operation onto range designation screen 40. Note that area frame 45 may be displayed not necessarily on display monitor 220.

In range designation screen 40, when the two areas are designated by the user, the areas corresponding to the focus stacking range are subjected to display-highlighting 51. For example, as shown in FIG. 11C, in range designation screen 40, the following areas are subjected to display-highlighting 51 that indicates the focus stacking range (i.e. the range which the user wants to bring into focus). Such areas include: designated area (1) (associated with the second AF area shown in (A) of FIG. 6); designated area (2) (associated with the 42th AF area shown in (A) of FIG. 6); and a group of areas associated with AF areas each of which has a focus position between the focus position of the AF area associated with area (1) and the focus position of the AF area associated with area (2). Through display-highlighting 51 in this way, the user can easily recognize the range (focus stacking range) which the user has designated as the range to be brought into focus. The user can determine the focus stacking range, which has been designated in range designation screen 40, by either touching "SET" button 61 or depressing decision button 214 disposed on the rear of the camera.

2-1-2-2. Stacking Processing

Referring to focus information table 60, controller 180 specifies the frame number of a frame that has a focus position for each of the areas that have been specified as the focus stacking range in range designation screen 40 as shown in FIG. 11C. Then, controller 180 controls image processor 160 such that the processor performs focus stacking processing by using the frame images associated with the thus-specified frame numbers. Upon receiving the instructions from controller 180, image processor 160 performs the focus stacking processing.

When the focus stacking processing is performed, object's positions, having been obtained by shooting an object, appearing in the frame images to be combined are required to be identical to each other among all the frame images to be combined. If the object's positions in the frame images are out of position relative to each other, a resultant combined image will show multiple contours of the object, leading to an apparent failure. In particular, as in the case of the embodiment, when focus stacking is performed by using frame images that configure a moving image, a camera shake and/or object's movement during recording the moving image sometimes cause variations in position of the object. For this reason, in the focus stacking, the positions of the frame images to be combined are required to be aligned with each other.

Figure 12:
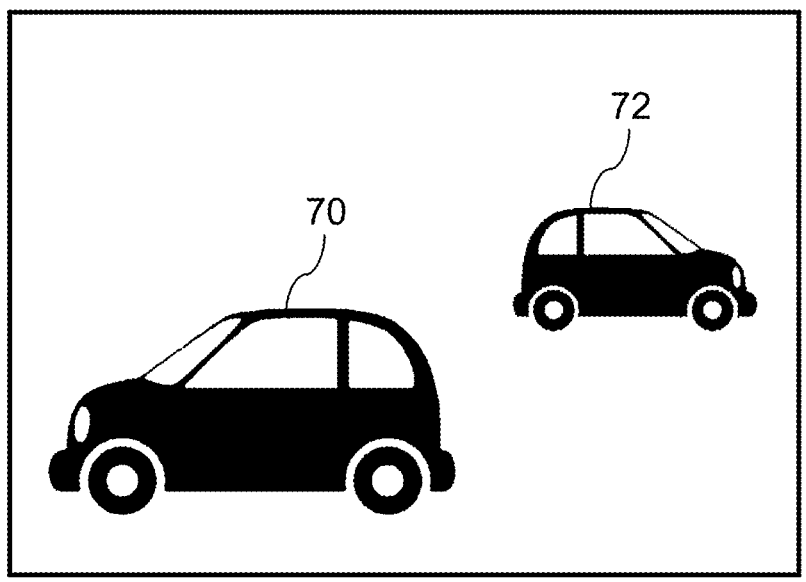
FIG. 12 is a view illustrating an example of objects shown in the images to be combined by stacking.
Figure 13:
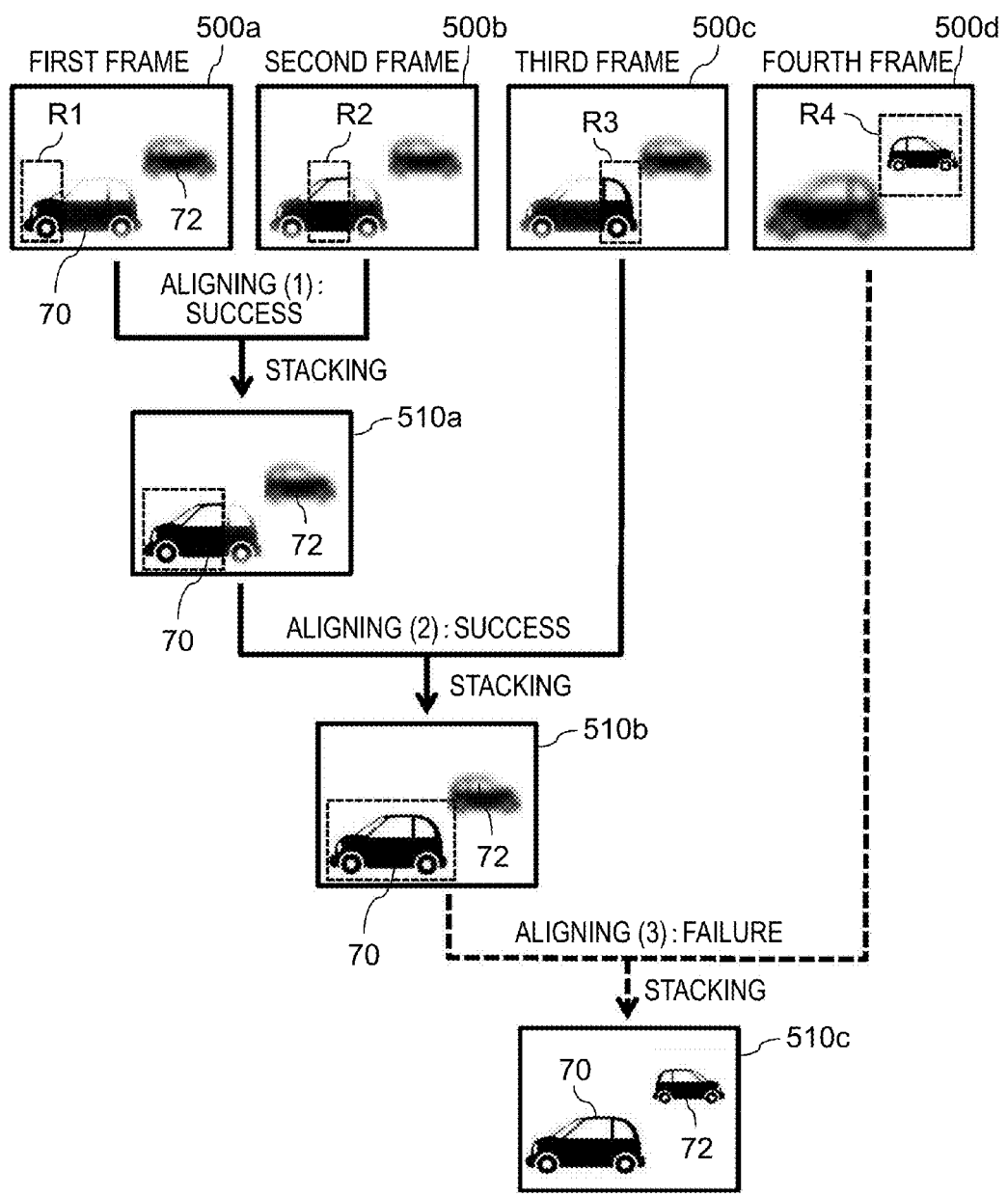
FIG. 13 is a view illustrating alignment of the images for use in the stacking processing.
Figure 14:
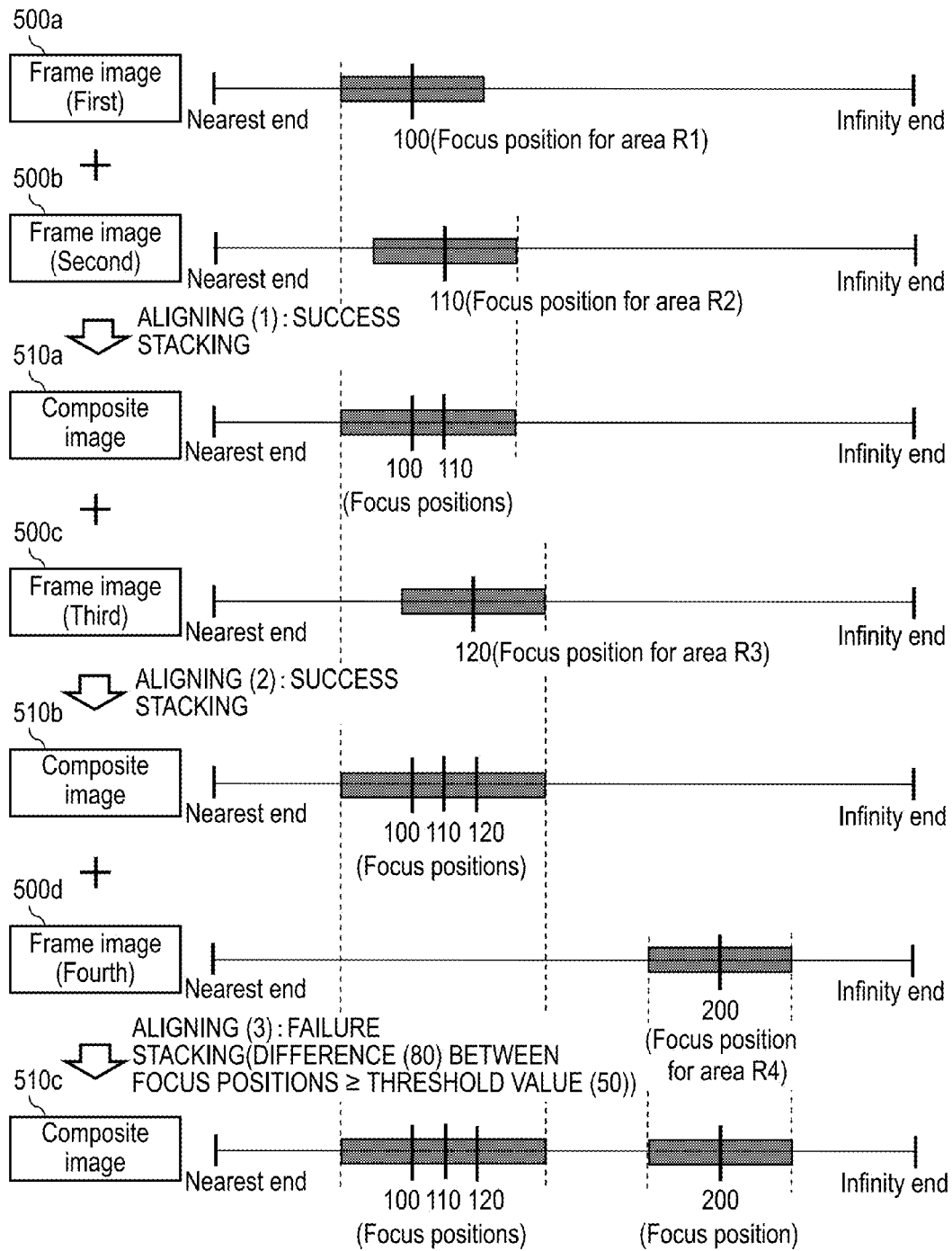
FIG. 14 is a view illustrating a relation between focus positions and the alignment/stacking processing.

With reference to FIGS. 12 to 14, a problem of alignment of images in focus stacking is described. Here, a case is assumed in which two vehicles 70 and 72 serving as objects are shot. In this case, of the two objects, object 70 is located at a position near to digital camera 100 while object 72 is located at a position far from digital camera 100. That is, it is assumed that object 70 is located closer to digital camera 100 than object 72.

FIG. 13 is a view illustrating alignment performed when focus stacking is carried out by using some of frame images that configure a multi-focus moving image in which objects, i.e. two objects 70 and 72 as shown in FIG. 12, has been shot. In FIG. 13, a case is assumed in which the stacking is performed by using 4 (four) frame images 500a to 500d which were produced by continuously shooting while focus lens 111 was being moved from the nearest end side to the infinity end side. As shown in FIG. 13, let area R1 be an in-focus area in the first frame image; area R2 in the second frame image; area R3 in the third frame image; and area R4 in the fourth frame image.

To begin with, first frame image 500a and second frame image 500b are combined. In this case, after second frame image 500b has been aligned with first frame image 500a, these frame images are combined. To align the images, edge information of these images is necessary. At this time, in first frame image 500a, an area which corresponds to area R2 is not strictly in focus. In second frame image 500b, an area which corresponds to area R1 is not strictly in focus. Fortunately, the following areas contain the same object, and their focus positions are not far away from each other. Such areas are area R1 in first frame image 500a, and the area, which corresponds to area R1, in second frame image 500b. Likewise, the following areas as well contain the same object, and their focus positions are not far away from each other. Such areas are area R2 in second frame image 500b, and the area, which corresponds to area R2, in first frame image 500a. Therefore, both the area, which corresponds to area R2, in first frame image 500a and the area, which corresponds to area R1, in second frame image 500b, are not in focus; however, they have edge information at a certain level. As a result, it is possible to acquire the edge information at a certain level on areas R1 and R2, from both frame images 500a and 500b. Therefore, in accordance with the edge information, it becomes possible to align second frame image 500b with first frame image 500a; alignment (1); success. Then, second frame image 500b is aligned and combined with first frame image 500a, thereby generating combined image 510a in which object 70 is in focus in area R1 and area R2.

Subsequently, third frame image 500c is combined with combined image 510a. With this process, combined image 510b is generated in which area R3 of object 70 is combined. Also in this case, in areas R1 to R3, both combined image 510a and third frame image 500c contain the same object and their focus positions are close to each other. As a result, it is possible to acquire edge information on areas R1 to R3, from both combined image 510a and third frame image 500c. This allows third frame image 500c to be aligned with combined image 510a; alignment (2): success.

Finally, it is required to combine combined image 510b with fourth frame image 500d; however, it is difficult to align fourth frame image 500d with combined image 510b. The reason for this is as follows: In combined image 510b, object 70 located nearer is in focus while object 72 located farther is not in focus. In contrast, in fourth frame image 500d, object 70 located nearer is not in focus while object 72 located farther is in focus. That is, in the combining process, objects 70 and 72 have to be treated between fourth frame image 500d and combined image 510b; therefore, this requires a comparison between an in-focus image (an image being in focus) and an out-of-focus image (an image being in blurred focus). Concerning object 70, edge information effective for the alignment can be acquired from combined image 510b; however, edge information effective for the alignment cannot be acquired from fourth frame image 500d. In contrast, concerning object 72, edge information effective for the alignment can be acquired from fourth frame image 500d; however, edge information effective for the alignment cannot be acquired from combined image 510b. In this way, the same object is in focus in one of fourth frame image 500d and combined image 510b, but out of focus in the other. In this case, it is difficult to perform the alignment, in accordance with the edge information, between fourth frame image 500d and combined image 510b; alignment (3): failure.

As described above, in cases where each of the two images to be aligned does not have an in-focus area (or an area exhibiting a relatively high contrast value) of the same object, it is difficult to perform alignment of them. Then, in cases where alignment ends in failure and yet where the subsequent stacking processing is not performed, it poses a problem that a combined image having a depth desired by the user cannot be obtained. For example, in the case shown in FIG. 13 where fourth frame image 500d is not subjected to stacking process because of the failure of alignment, it is difficult to generate an image, such as combined image 510b, in which object 72 is in focus. As a result, the image with a depth of field desired by the user cannot be obtained.

This situation described above occurs in cases where the focus stacking is performed by using frame images that configure a moving image, as described in the embodiment. Such a situation is considered to possibly occur in cases where focus positions of two images to be combined are relatively far away from each other. Moreover, if an out-of-focus image is combined with an in-focus image, it has substantially no influence on a resulting combined image, in terms of resolution.

Hence, in digital camera 100 according to the embodiment, it operates as follows: Even in cases where alignment of two images ends in failure, the images are combined without performing the alignment if a difference between focus positions (focus lens positions) of the two images is not smaller than a predetermined threshold value. That is, as shown in FIG. 13, even in the case where alignment (3) ends in failure between fourth frame image 500d and combined image 510b, the focus stacking processing is performed between fourth frame image 500d and combined image 510b if a difference between focus positions of the two images is not smaller than the predetermined threshold value. This allows the generation of combined image 510c.

FIG. 14 is a view illustrating a relation between focus positions and alignment/stacking processing. FIG. 14 shows an example in which, the focus position of area R1 in first frame image 500a is 100; the focus position of area R2 in second frame image 500b is 110; the focus position of area R3 in third frame image 500c is 120; and the focus position of area R4 in fourth frame image 500d is 200. Moreover, the threshold value of the difference between focus positions is set to 50 at or above which focus stacking process between two images is performed even though alignment of the two images ends in failure. In this case, as shown in FIG. 13, area R4 is combined with combined image 510b even though combined image 510b cannot be aligned with fourth frame image 500d in accordance with the edge information. The reason for this is as follows: The focus position of area R4 is 200, while the closest focus position, which is closest to the focus position of area R4 in combined image 510b, is 120. Accordingly, the difference (80) in their focus positions is not smaller than the threshold value (50).

In contrast, if the alignment of area R1 of first frame image 500a with area R2 of second frame image 500b cannot be performed in accordance with the edge information, the focus stacking processing is not performed between area R1 and area R2. This is because the focus position of area R1 is 100 while the focus position of area R2 is 110. Then, the difference (10) between these focus positions is smaller than the threshold value (50). If two images, which have focus positions relatively closer to each other, are forcibly combined in a state of their alignment having ended in failure, the thus-combined portions of the two images are out of position relative to each other. Accordingly, the resulting combined image is prone to cause an uncomfortable feeling about the portions out of position. The threshold value can be set appropriately at a level such that the resulting combined image will not cause such an uncomfortable feeling.

Hereinafter, with reference to flowcharts shown in FIGS. 15 and 16, the stacking process (S22) in the flowchart shown in FIG. 10 is described in detail.

Figure 5:
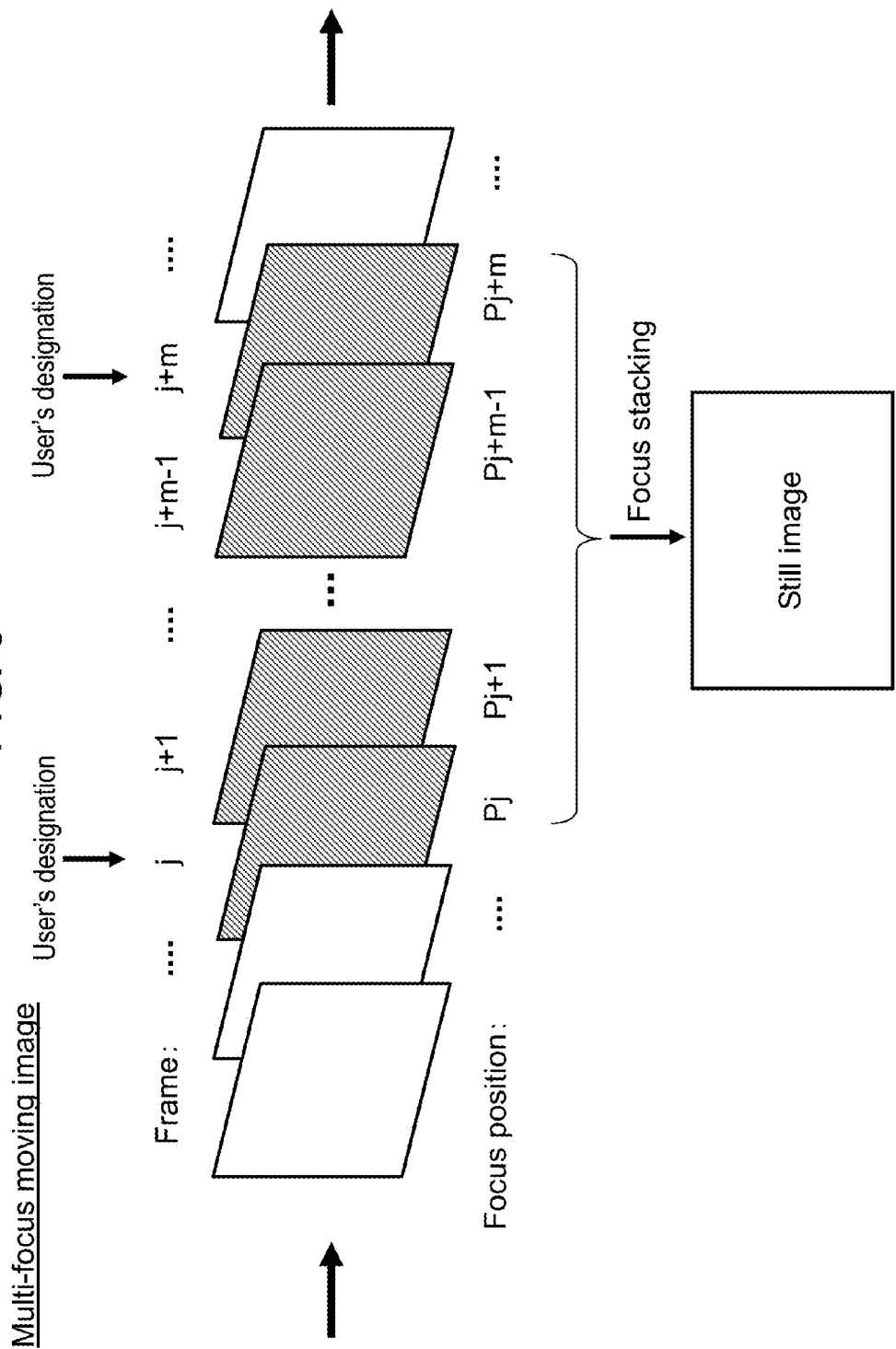
FIG. 5 is a view illustrating a concept of focus stacking by using frame images of the multi-focus moving image.
Figure 15:
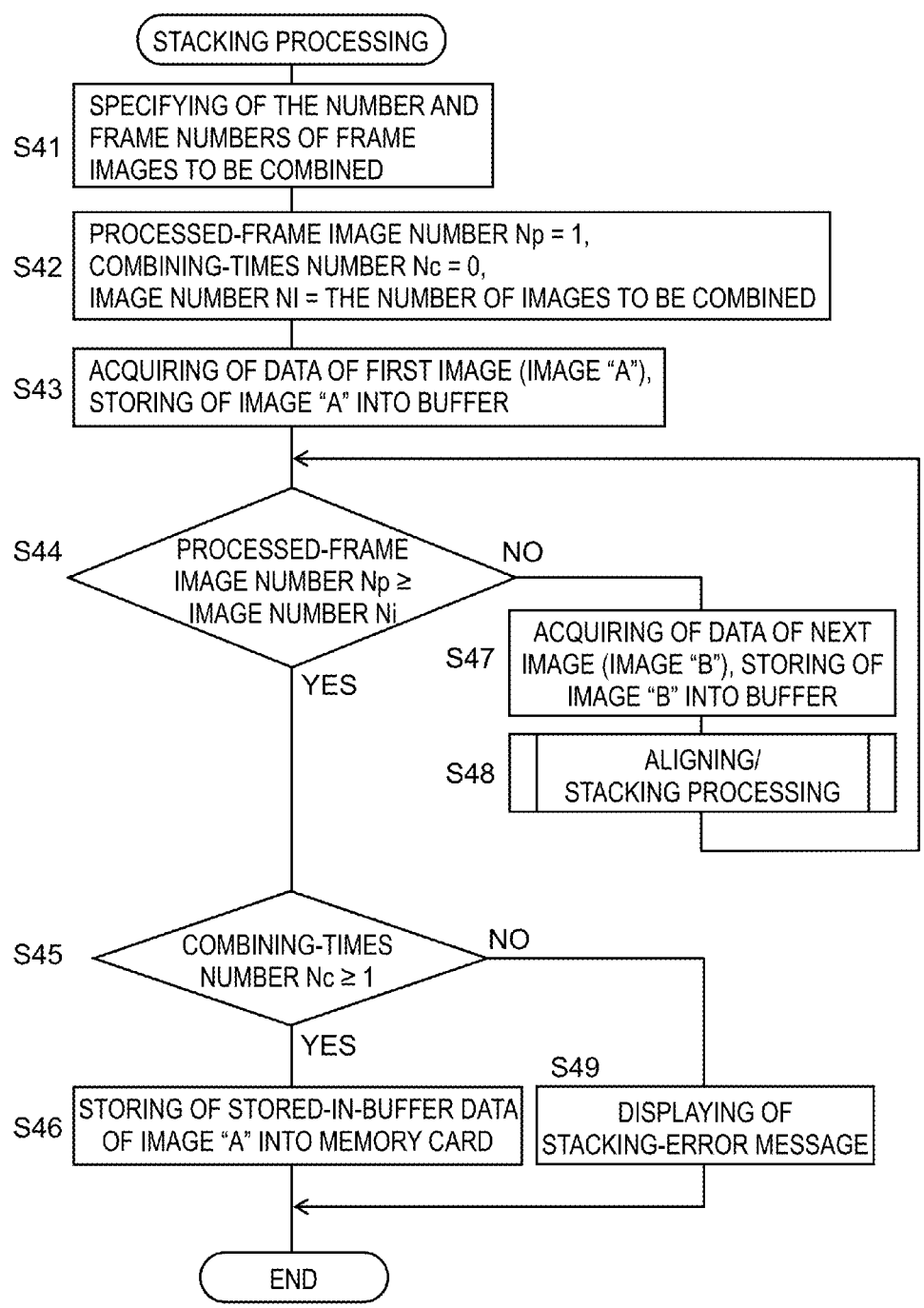
FIG. 15 is a flowchart illustrating the stacking processing.

FIG. 15 is the flowchart that illustrates details of the stacking process (S22) shown in FIG. 10. First, controller 180 specifies both the frame numbers of frame images to be combined and the number of the frame images to be combined, in accordance with the focus stacking range that has been set previously (S41). Specifically, for each of the areas that have been specified as the focus stacking range in range designation screen 40, the controller specifies the frame number of a frame that has a focus position in the corresponding area, with reference to focus information table 60. For example, as shown in FIG. 5, in the case where the frame images that have focus positions in AF areas corresponding to two areas designated in range designation screen 40 are the j-th and j+m-th images, controller 180 determines the frame numbers to be j, j+1, . . . , j+m, with reference to focus information table 60.

Next, controller 180 initializes every variable to be used for control (S42). Specifically, processed-frame image number Np is set to 1 (one) which indicates the number of the frame images that have been processed; combining-times number Nc is set to 0 (zero) which indicates the number of times of the stacking processing; and image number Ni which indicates the total number of the frame images to be processed is set equal to the number of the frame images to be combined that have been determined in Step S41. Processed-frame image number Np is incremented by 1 (one) every time aligning/stacking processing (S48 of FIG. 15), to be described later, is performed for all of the frame images to be combined. Combining-times number Nc is incremented by 1 (one) every time the stacking processing of images is performed.

Next, controller 180 extracts, from the multi-focus moving image, image data of the first one of the frame images to be combined, and then stores the thus-extracted data in buffer 170 (S43). For example, there are extracted the image data of a frame image which is closest to the nearest end, from among a group of the frame images to be combined. The data are stored as "image A" in buffer 170.

Then, controller 180 determines whether or not all of the frame images to be combined have been processed (S44). Specifically, controller 180 determines whether processed-frame image number Np is not smaller than image number Ni (S44).

When not all of the frame images to be combined have been processed, that is, processed-frame image number Np is smaller than image number Ni (NO in S44), controller 180 extracts image data of the next one of the frame images to be combined, from among the multi-focus moving image, and then stores the thus-extracted data as "image B" in buffer 170 (S47). Then, controller 180 performs aligning and stacking processing of image "A" and image "B" that are both stored in buffer 170 (S48). Details of the aligning and the stacking processing will be described later. After the aligning and the stacking processing, the process returns to Step S44.

When all of the frame images to be combined have been processed, that is, processed-frame image number Np is not smaller than image number Ni (YES in S44), controller 180 determines whether or not the stacking processing has been performed at least one time (S45). Specifically, controller 180 determines whether combining-times number Nc is not smaller than 1 (one) (S45). When no stacking processing has been performed, that is, combining-times number Nc is smaller than 1 (one) (NO in S45), controller 180 displays an error message (S49). For example, display monitor 220 displays the error message saying that no focus stacking processing has been performed. On the other hand, when the stacking processing has been performed, that is, combining-times number Nc is not smaller than 1 (one) (YES in S45), controller 180 stores the image data of image "A" as a focus-stacked image into memory card 200, with image data having been stored in buffer 170 (S46).

By the method described above, the focus stacking processing using the frame images to be combined is performed.

Figure 16:
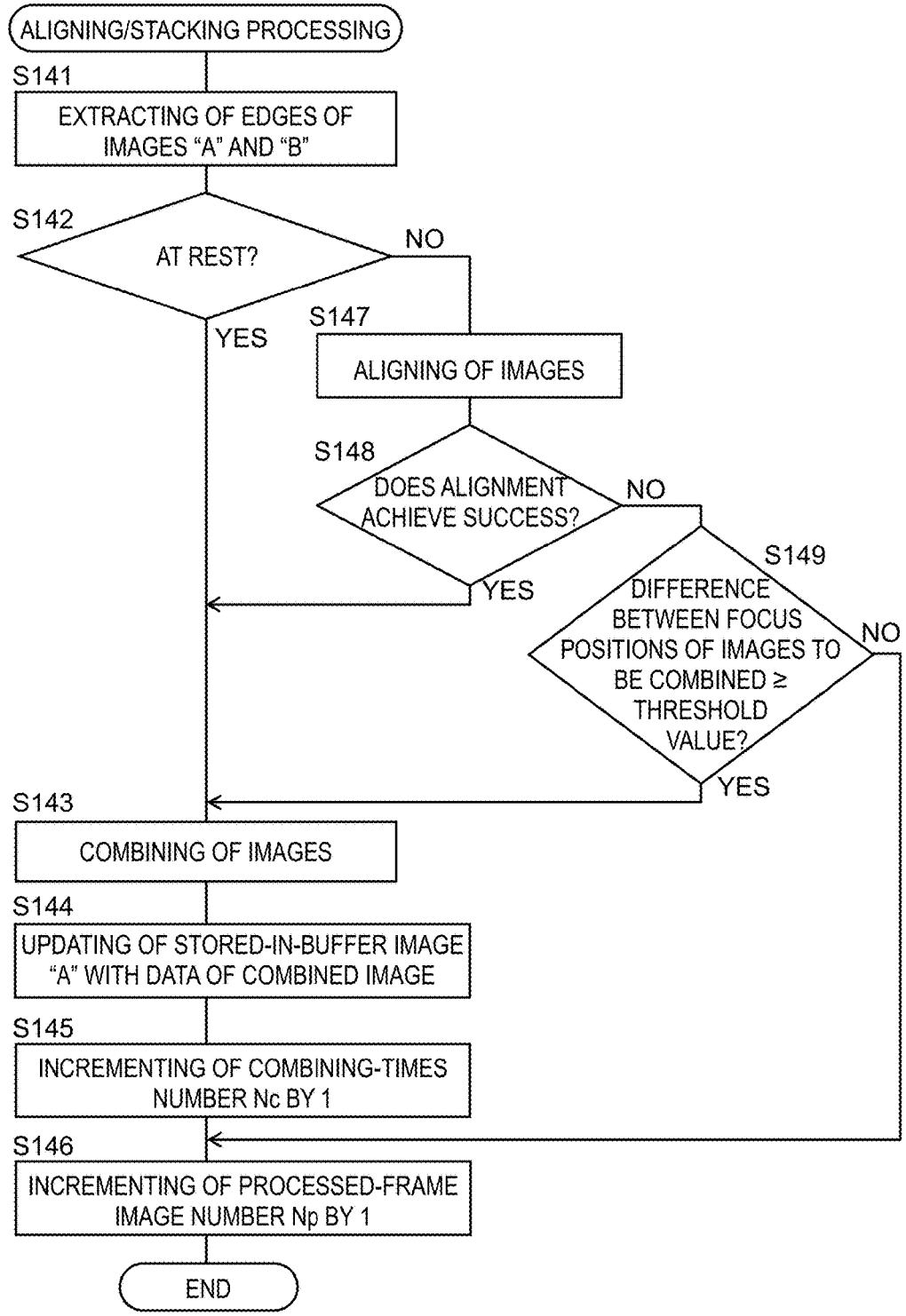
FIG. 16 is a flowchart illustrating the aligning/stacking processing.

FIG. 16 is the flowchart illustrating details of the aligning/stacking processing (S48) in the flowchart shown in FIG. 15. With reference to the flowchart shown in FIG. 16, the details of the aligning/stacking processing (S48) are described.

Controller 180 detects edge information from each of image "A" and image "B" stored in buffer 170 (S141). After that, controller 180 determines whether or not digital camera 100 was at rest during the recording of the multi-focus moving image (S142). This determination is made based on a rest determination flag that is contained in the moving image data of the multi-focus moving image. Such a rest determination flag is a flag that indicates whether or not digital camera 100 is at rest. The rest determination flag is set based on an output signal from gyro sensor 250. When motion of digital camera 100 is smaller than a predetermined value, the rest determination flag is set to a value that indicates "being at rest." When the motion of digital camera 100 is not smaller than the predetermined value, the rest determination flag is set to a value that indicates "being not at rest." For example, when digital camera 100 is mounted and fixed on a tripod, gyro sensor 250 does not detect any motion of digital camera 100. As a result, the rest determination flag is set to the value that indicates "being at rest." The rest determination flag is set when a multi-focus moving image is recorded. For example, one flag may be set for the whole of the moving image data, based on the state of digital camera 100 when it starts recording the moving image. Alternatively, a flag may be set for every frame, based on the state of digital camera 100 every time when the frame image is shot.

When it is determined that digital camera 100 was at rest (YES in S142), controller 180 controls image processor 160 such that the processor performs the stacking processing of image "A" and image "B" (S143). In cases where digital camera 100 was at rest, it is considered that the images are not out of position relative to each other; therefore, the alignment of the images is not performed in these cases. Note that, in the stacking processing, each of the pixels of the resulting combined image is determined in the following manner. That is, two corresponding pixels of images "A" and "B" are compared in terms of contrast, and then the higher one of the two is selected and determined to be the pixel of the resulting combined image.

On the other hand, when it is determined that digital camera 100 was not at rest (NO in S142), controller 180 performs alignment of image "A" and image "B" (S147). Specifically, controller 180 detects an amount of misalignment of image "B" with respect to image "A," by using the edge information that is extracted from each of image "A" and image "B." That is, controller 180 compares image "A" and image "B" in accordance with the edge information, thereby detecting how much image "B" is out of position with respect to image "A" in the X- and Y-directions, and detecting how much the former rotates relative to the latter. Moreover, controller 180 also detects an enlargement/reduction ratio of the entire image because there are cases where the object's image size varies when the image is shot with the focus position being changed. Then, when the amounts of these misalignment factors (e.g. the deviation in the X-direction, deviation in the Y-direction, rotation angle, enlargement/reduction ratio) are detected, it is determined that the alignment has achieved "success."

In this case, when the alignment achieves success (YES in S148), controller 180 causes the process to proceed to Step S143, and then performs the stacking processing of image "A" and image "B," in the state of image "B" being in alignment with image "A." In the case shown in FIGS. 13 and 14, since the alignment of second frame image 500b with first frame image 500a achieves success, their stacking process is then performed. Likewise, since the alignment of third frame image 500c with combined image 510a achieves success, their stacking process is performed.

On the contrary, however, in the case where the alignment ends in failure (NO in S148), controller 180 determines whether a difference between focus positions of image "A" and image "B" is not smaller than the threshold value (S149). The determination is made as to whether an object contained in both image "A" and image "B" is in the situation or not where the object's image in one of image "A" and image "B" is in focus while the object's image in the other is out of focus. Note that, when image "A" has a plurality of focus positions, controller 180 computes a difference between each of these focus positions and the focus position to be compared, determines the minimum value of the thus-computed differences, and then determines whether the thus-determined minimum value is not smaller than the threshold value. When the difference between the focus positions is determined to be smaller than the threshold value (NO in S149), controller 180 increments processed-frame image number Np by 1 (one) without performing the image combining processing, and then ends the process.

On the contrary, when the difference between the focus positions is determined to be not smaller than the threshold value (YES in S149), controller 180 causes the process to proceed to Step S143. In the step, the controller controls image processor 160 such that the processor performs the stacking processing of image "A" and image "B," in the state of image "B" being in alignment with image "A." In the case shown in FIGS. 13 and 14, although the alignment of fourth frame image 500d with combined image 510b ends in failure, their stacking process is performed. This is because the difference (80) in focus position is not smaller than the threshold value (50). Note that, with the assumption that a large threshold value (e.g. 100) exceeding the difference (80) in focus position is set, the difference (80) is then smaller than the threshold value (100). Therefore, the stacking processing of combined image 510b and fourth frame image 500d is not performed in this case.

After having performed the process of combining the images, controller 180 stores the image data of the combined image of image "A" and image "B," as a new image "A," into buffer 170 (S144). That is, controller 180 updates image "A" stored in buffer 170 with the image data of the combined image.

After that, controller 180 increments, by 1 (one), each of combining-times number Nc and processed-frame image number Np (S145 and S146), then ends the process.

As described above, in the embodiment, even in cases where alignment of images ends in failure, the images are combined if a difference between focus positions of the images is not smaller than a threshold value. With this configuration, even in cases where alignment of images cannot be achieved, it is possible to obtain an image with a deeper depth of field.

3. Advantages and Others

Digital camera 100 according to the embodiment includes: CCD 140, image processor 160 (an example of an image processor), and controller 180. The CCD captures an object image, while its focus position is being changed, to produce data of a plurality of images (i.e. data of frame images that configure a moving image). The image processor combines the data of the plurality of the images produced by CCD140, thereby generating data of a still image which is deeper in depth of field than the captured images. In generating the data of the still image, the controller controls image processor 160 such that the processor combines data of two images after having performed alignment of the images that are expressed by the data of the two images to be combined. Controller 180 controls image processor 160 such that, in cases where the alignment achieves success (YES in S148), the processor combines the data of the two images (S143). In cases where the alignment ends in failure (NO in S148), however, the controller controls image processor 160 in the following manner. That is, if a difference between focus lens positions, during image-shooting, of the data of the two images is smaller than a threshold (an example of a predetermined value) (NO in S149), the processor does not combine the data of the two images; if the difference between the focus lens positions is not smaller than the threshold (YES in S149), the processor combines the data of the two images. With the control described above, even in cases where the alignment of the images ends in failure, the images are combined if the difference between the focus positions of the images is not smaller than the threshold value. With this configuration, an image with a deeper depth of field can be obtained even in cases where the alignment of the images cannot be achieved.

Moreover, digital camera 100 further includes focus information table 60 in which pieces of the following information are associated with each other. Such information includes: frame numbers (an example of information specifying the data of each of the images), AF areas (an example of information indicating in-focus areas in the data of each of the images), and focus lens positions at a time when the data of each of the frame images are produced. By referring to focus information table 60, it is possible to specify the frame number of an in-focus frame in each AF area (a part of the image area), and specify the focus lens position associated with each frame image.

Moreover, digital camera 100 further includes flag information which indicates whether or not digital camera 100 was at rest at a time when the data of the plurality of the frame images were produced. In cases where the flag information indicates that digital camera 100 was not at rest (NO in S142), controller 180 performs the alignment of the images that are expressed by the data of the two images to be combined (S147). If digital camera 100 was not at rest, there is a high possibility that the frame images have been out of position relative to each other due to camera shakes and the like. Accordingly, in cases where digital camera 100 was not at rest, the alignment of the frame images results in the generation of a combined image with high quality.

In contrast, in cases where the flag information indicates that digital camera 100 was at rest (YES in S142), controller 180 performs the process of combining the data of the two images, without performing the alignment of the images that are expressed by the data of the two images to be combined (S143). If digital camera 100 was at rest, there is a low possibility that the frame images were out of position relative to each other due to camera shakes and the like. In these cases, not performing the alignment results in a reduction in processing load and processing time.

Other Exemplary Embodiments

As described above, the first embodiment has been described to exemplify the technology disclosed in the present application. However, the technology is not limited to the embodiment, and is also applicable to embodiments that are subjected, as appropriate, to various changes and modifications, replacements, additions, omissions, and the like. Moreover, the technology disclosed herein also allows another embodiment which is configured by combining the appropriate constituent elements in the first embodiment described above. Hence, other embodiments will be exemplified hereinafter.

In the embodiment described above, in cases where the alignment ends in failure, the determination is made whether or not to perform the process of combining the images based on the difference between the focus lens positions (focus positions) of the images at a time when the two images to be combined were shot. However, the index for the determination is not limited to the difference between the focus lens positions (focus positions). For example, the determination may be made based on a difference between camera-to-same-object distances in the two images, with the same object being in focus in the two.

In the embodiment described above, the focus stacking processing is performed by image processor 160 of digital camera 100, serving as an imaging apparatus, through use of the frame images that have been produced by CCD 140 serving as an imaging unit. However, the focus stacking processing may be performed not in the inside of digital camera 100. For example, the image data of frame images produced by the imaging unit of the imaging apparatus may be transmitted to a server or a personal computer (PC) which is provided with an image processor, and then the image processor performs the focus stacking processing of the image data. In this case, the server or PC functions as the image processor.

In the embodiment described above, the focus stacking is performed through use of the frame images that configure a multi-focus moving image. However, the focus stacking may be performed through use of a plurality of still images which have been produced by continuous shooting, instead of the frame images that configure a multi-focus moving image.

The idea disclosed by describing the above embodiment is applicable to two types of digital cameras, that is, interchangeable lens cameras and integrated lens cameras.

In the embodiment described above, the descriptions have been made by using the case of the digital camera, as an example of the imaging apparatus; however, the imaging apparatus is not limited to the case. The idea according to the present disclosure is applicable to a wide range of imaging apparatuses capable of shooting moving images, with the apparatuses including digital video cameras, smartphones, and wearable cameras.

In the embodiment described above, the imaging element is configured with a CCD; however, the imaging element is not limited to this. The imaging element may be configured with, such as, an N-channel metal oxide semiconductor (NMOS) image sensor or a complementary metal oxide semiconductor (CMOS) image sensor.

As described above, the exemplary embodiments have been described to exemplify the technology according to the present disclosure. To that end, the accompanying drawings and the detailed descriptions have been provided. Therefore, the constituent elements described in the accompanying drawings and the detailed descriptions may include not only essential elements for solving problems, but also inessential ones for solving the problems which are described only for the exemplification of the technology described above. For this reason, it should not be acknowledged that these inessential elements are considered to be essential only on the grounds that these inessential elements are described in the accompanying drawings and/or the detailed descriptions. Moreover, because the aforementioned embodiments are used only for the exemplification of the technology disclosed herein, it is to be understood that various changes and modifications, replacements, additions, omissions, and the like may be made to the embodiments without departing from the scope of the appended claims or the scope of their equivalents.

INDUSTRIAL APPLICABILITY

The technology according to the present disclosure is applicable to imaging apparatuses capable of shooting moving images. Specifically, the technology is applicable to a wide range of imaging apparatuses capable of shooting moving images, with the apparatuses including digital cameras, digital video cameras, smartphones, and wearable cameras.

What is claimed is:

1. An imaging apparatus, comprising:
    an imaging unit for capturing an object image, while changing a focus position to generate data of a plurality of images, each of the plurality of the images having a corresponding one of different focus positions;
    an image processor for combining the data, generated by the imaging unit, of the plurality of the images so as to generate data of a still image deeper in depth of field; and
    a controller for controlling the image processor, in generating the data of the still image by combining data of two images included in the plurality of the images, such that:
        the image processor attempts to perform alignment of images expressed by data of the two images to be combined;
        when the alignment achieves success, the controller controls the image processor such that the image processor combines the data of the two images;
        when the alignment ends in failure and yet where a difference between focus positions of the two images is smaller than a predetermined value, the focus positions of the two images being obtained when the data of the two images are generated, the controller controls the image processor such that the image processor does not combine the data of the two images; and
        when the alignment ends in failure and yet where the difference between the focus positions of the two images is not smaller than the predetermined value, the controller controls the image processor such that the image processor combines the data of the two images.

2. The imaging apparatus according to claim 1, the imaging apparatus having information that includes:
    a piece of information for specifying data of each of the plurality of the images;
    a piece of information for indicating an in-focus area in the each of the plurality of the images; and
    a piece of information on the corresponding focus position of the each of the plurality of the images, the corresponding focus position being produced when the data of the plurality of the images are generated,
    wherein the pieces of the information are associated with each other.

3. The imaging apparatus according to claim 1, the imaging apparatus having flag information that indicates whether the imaging apparatus was at rest when the data of the plurality of the images were generated,
    wherein the attempting to perform alignment by the image processor depends on the flag information;

wherein, when the flag information indicates that the imaging apparatus was not at rest, the controller performs the alignment of images expressed by the data of the two images to be combined.

4. The imaging apparatus according to claim 3, wherein, when the flag information indicates that the imaging apparatus was at rest, the controller combines the data of the two images without attempting to perform the alignment of the images expressed by the data of the two images to be combined.

5. The imaging apparatus according to claim 1, wherein the data of the plurality of the images are data of a plurality of frame images configuring a moving image.

6. An image processing apparatus, comprising:
   an image processor for combining data, generated by an imaging apparatus, of a plurality of images so as to generate data of a still image deeper in depth of field, each of the plurality of the images having a corresponding one of different focus positions; and
   a controller for controlling the image processor, in generating the data of the still image by using data of two images included in the plurality of the images, such that the image processor attempts to perform alignment of images expressed by data of the two images to be combined;
   when the alignment achieves success, the controller controls the image processor such that the image processor combines the data of the two images;
   when the alignment ends in failure and yet where a difference between focus positions of the two images is smaller than a predetermined value, the focus positions of the two images being obtained when data of the two images are generated, the controller controls the image processor such that the image processor does not combine the data of the two images; and
   when the alignment ends in failure and yet where the difference between the focus positions of the two images is not smaller than the predetermined value, the controller controls the image processor such that the image processor combines the data of the two images.

7. The image processing apparatus according to claim 6, wherein the image processing apparatus acquires, from the imaging apparatus, information including:
   a piece of information for specifying data of each of the plurality of the images;
   a piece of information for indicating an in-focus area in the each of the plurality of the images; and
   a piece of information on the corresponding focus position of the each of the plurality of images, the corresponding focus position being produced when the data of the plurality of the images are generated; and
   the pieces of the information are associated with each other.

8. The image processing apparatus according to claim 6, the image processing apparatus having flag information that indicates whether the imaging apparatus was at rest when the data of the plurality of the images were generated,
   wherein the attempting to perform alignment by the image processor depends on the flag information;
   wherein, when the flag information indicates that the imaging apparatus was not at rest, the controller performs the alignment of images expressed by the data of the two images to be combined.

9. The image processing apparatus according to claim 8, wherein, when the flag information indicates that the imaging apparatus was at rest, the controller combines the data of the two images without attempting to perform the alignment of the images expressed by the data of the two images to be combined.

10. The image processing apparatus according to claim 6, wherein the data of the plurality of the images are data of a plurality of frame images configuring a moving image.

* * * * *